(12) United States Patent
Ichikawa et al.

(10) Patent No.: US 8,368,352 B2
(45) Date of Patent: Feb. 5, 2013

(54) CHARGING AND DISCHARGING SYSTEM AND ELECTRIC-POWERED VEHICLE

(75) Inventors: Shinji Ichikawa, Toyota (JP); Tetsuhiro Ishikawa, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 192 days.

(21) Appl. No.: 12/865,762

(22) PCT Filed: Jun. 3, 2009

(86) PCT No.: PCT/JP2009/060106
§ 371 (c)(1),
(2), (4) Date: Aug. 2, 2010

(87) PCT Pub. No.: WO2010/010754
PCT Pub. Date: Jan. 28, 2010

(65) Prior Publication Data
US 2011/0121779 A1    May 26, 2011

(30) Foreign Application Priority Data

Jul. 25, 2008  (JP) ................................ 2008-192388

(51) Int. Cl.
*H02J 7/00* (2006.01)
*H01R 11/00* (2006.01)
(52) U.S. Cl. ......... 320/109; 320/104; 320/128; 439/503
(58) Field of Classification Search .................. 320/103, 320/104, 106, 109, 111; 180/65.1, 65.21, 180/65.31; 439/34, 503; 307/10.1, 10.7; 702/76, 63
See application file for complete search history.

(56) References Cited

U.S. PATENT DOCUMENTS

| | | | |
|---|---|---|---|
| 5,202,617 A * | 4/1993 | Nor | 320/130 |
| 5,369,352 A | 11/1994 | Toepfer et al. | |
| 7,886,857 B2 * | 2/2011 | Fujitake | 180/65.29 |
| 8,198,855 B2 * | 6/2012 | Fukui et al. | 320/104 |
| 8,198,859 B2 * | 6/2012 | Tyler et al. | 320/109 |
| 8,258,743 B2 * | 9/2012 | Tyler et al. | 320/104 |

FOREIGN PATENT DOCUMENTS

| | | |
|---|---|---|
| EP | 2 056 420 A1 | 5/2009 |
| JP | A-03-273827 | 12/1991 |
| JP | A-07-007860 | 1/1995 |
| JP | A-07-123519 | 5/1995 |
| JP | A-11-018307 | 1/1999 |
| JP | A-2001-008380 | 1/2001 |
| JP | A-2008-054439 | 3/2008 |
| JP | A-2009-171733 | 7/2009 |

OTHER PUBLICATIONS

"SAE Electric Vehicle Conductive Charge Coupler," SAEJ1772; *SAE International*, Nov. 2001.

(Continued)

*Primary Examiner* — Richard V Muralidar
(74) *Attorney, Agent, or Firm* — Oliff & Berridge, PLC

(57) ABSTRACT

A control pilot circuit of a power cable having a male-type plug generates a pilot signal such that the power cable can be identified as a power cable for charging on the vehicle side. On the other hand, a control pilot circuit of a power cable having a not-shown female-type plug generates the pilot signal such that the power cable can be identified as a power cable for power feeding on the vehicle side. An ECU of a vehicle controls an AC/DC converter in any one of the charging mode and the power feeding mode in response to the pilot signal.

8 Claims, 7 Drawing Sheets

OTHER PUBLICATIONS

"Japan Electric Vehicle Association Standard, Electric Vehicle Conductive Charging System, General Requirements," *Japan Electric Vehicle Association*, Mar. 29, 2001 (With Translation).

International Search Report issued in Application No. PCT/JP2009/060106; Dated Sep. 1, 2009 (With Translation).

* cited by examiner

FIG.4
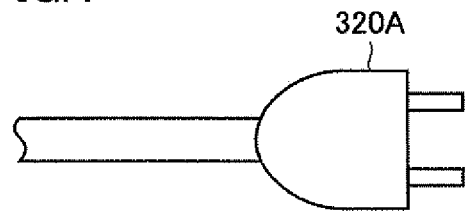
FIG.5
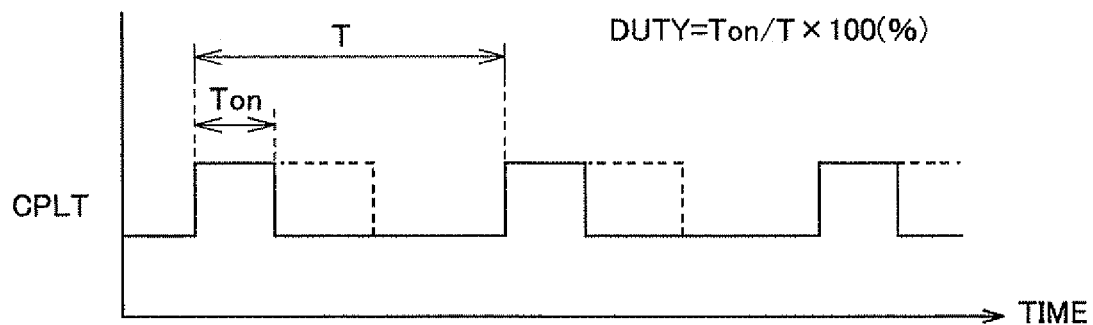
FIG.6
| CPLT DUTY (%) | CURRENT LIMIT (A) |
|---|---|
| d1~d2 | a1 |
| d2~d3 | a2 |
| d3~d4 | a3 |
| d4~d5 | a4 |
| d5~d6 | a5 |
| d6~d7 | a6 |

FIG.9
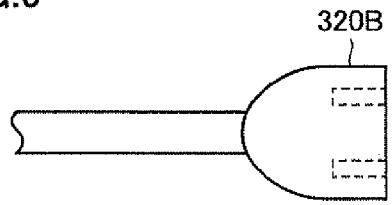
FIG.10
| CPLT DUTY (%) | CURRENT LIMIT (A) |
|---|---|
| d1~d2 | a1 |
| d2~d3 | a2 |
| d3~d4 | a3 |
| d4~d5 | a4 |
| d5~d6 | a5 |
| d6~d7 | a6 |
| d7~d8 | b1 |
| d8~d9 | b2 |
FOR CHARGING: d1~d2 through d6~d7
FOR POWER FEEDING: d7~d8, d8~d9
FIG.11
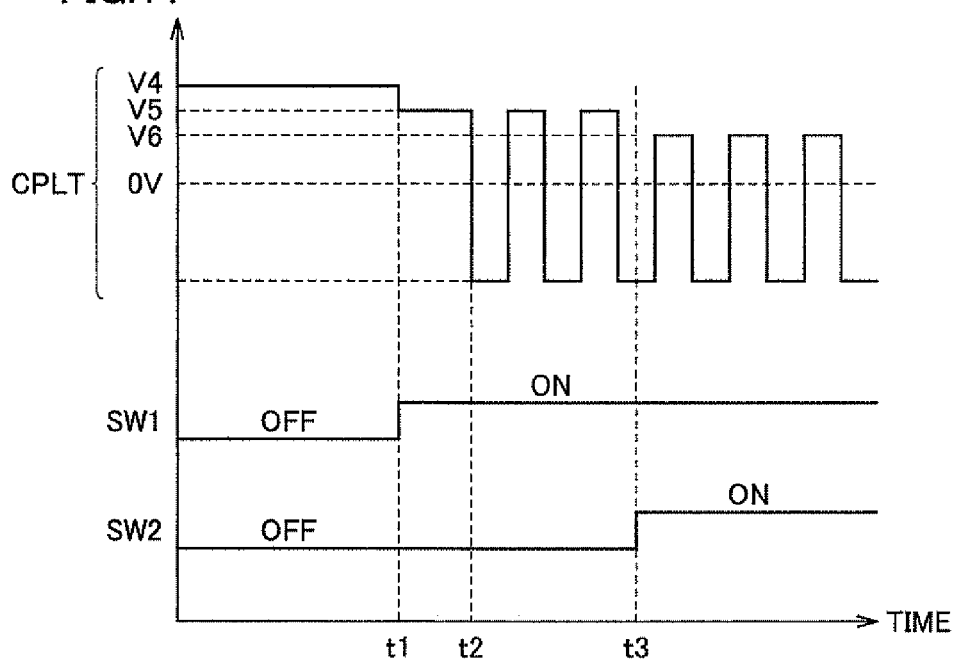

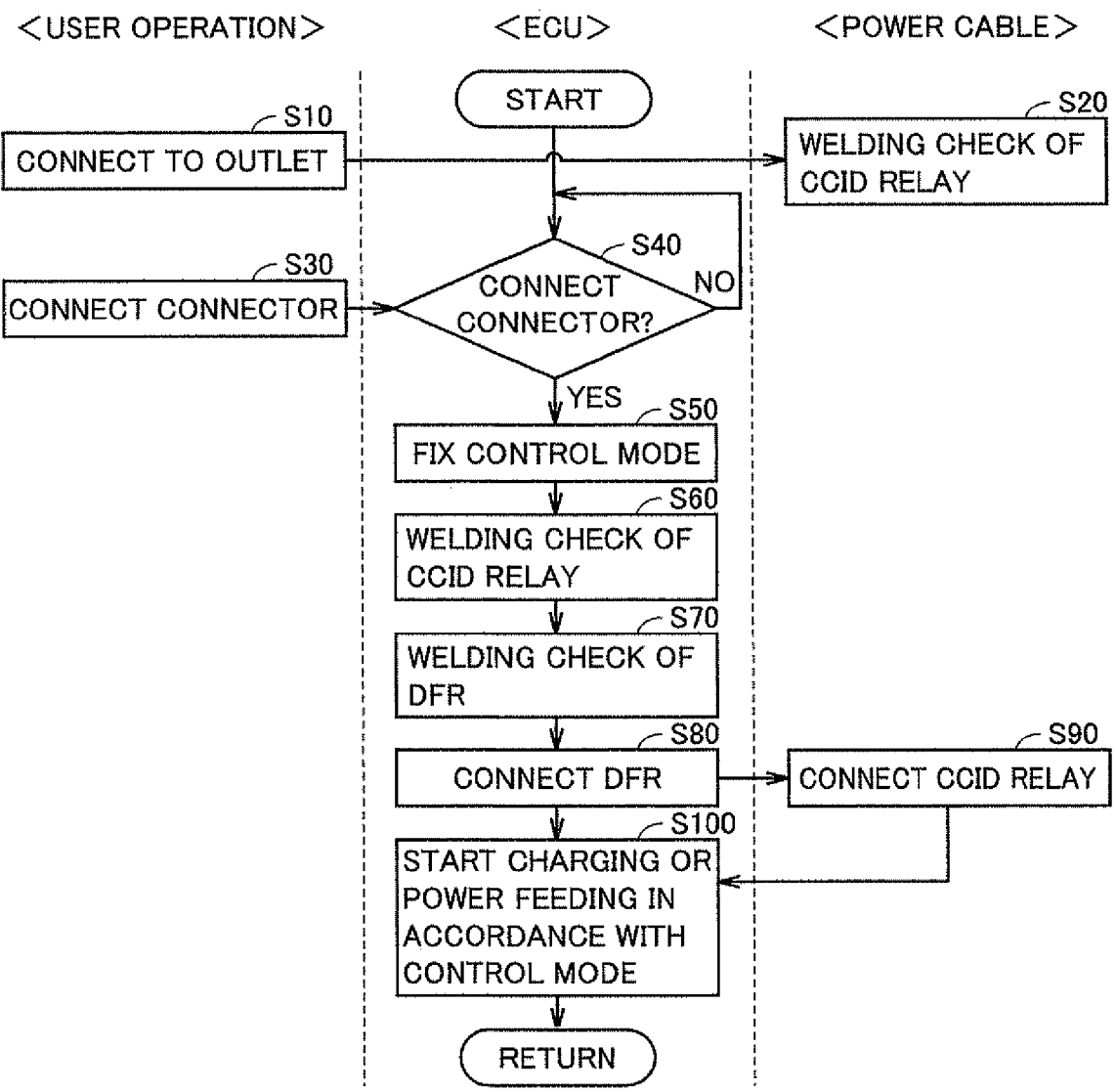

CHARGING AND DISCHARGING SYSTEM AND ELECTRIC-POWERED VEHICLE

TECHNICAL FIELD

The present invention relates to a charging and discharging system and an electric-powered vehicle. Particularly, the present invention relates to a charging and discharging system for an electric-powered vehicle that allows charging of a vehicle-mounted power storage device for traveling from a power supply external to the vehicle and allows power feeding from the power storage device to the power supply external to the vehicle or an electric load external to the vehicle.

BACKGROUND ART

Japanese Patent Laying-Open No. 2001-8380 (Patent Document 1) discloses a power management system where electric power can be transmitted between a battery of an electric vehicle and a house. In this power management system, a main controller on the house side determines the charging mode or the discharging mode, and a charging/discharging control signal is sent from a charging and discharging controller on the house side through a communication antenna to a battery controller on the vehicle side. The charging control or the discharging control is performed in the vehicle, based on the charging/discharging control signal received through the communication antenna (see Patent Document 1).

It is noted that the standard for the above-described electric vehicle that allows charging of the battery from the house is defined in "SAE Electric Vehicle Conductive Charge Coupler" (Non-Patent Document 1) in the United States of America, and in "Electric Vehicle Conductive Charging System, General Requirements" (Non-Patent Document 2) in Japan.

In these "SAE Electric Vehicle Conductive Charge Coupler" and "Electric Vehicle Conductive Charging System, General Requirements," the standard for a control pilot is defined as an example. The control pilot is defined as a control line that connects, via a control circuit on the vehicle side, a ground of the vehicle and a control circuit of EVSE (Electric Vehicle Supply Equipment) for supplying electric power from an on-premises wiring to the vehicle. Based on a pilot signal communicated through this control line, a connection state of a charging cable, whether or not electric power is supplied from a power supply to the vehicle, a rated current of the EVSE and the like are determined.

PRIOR ART DOCUMENTS

Patent Documents

Patent Document 1: Japanese Patent Laying-Open No. 2001-8380
Patent Document 2: Japanese Patent Laying-Open No. 11-18307
Patent Document 3: Japanese Patent Laying-Open No. 3-273827

Non-Patent Documents

Non-Patent Document 1: "SAE Electric Vehicle Conductive Charge Coupler," SAE J1772, SAE International, November, 2001

Non-Patent Document 2: "Japan Electric Vehicle Association Standard, Electric Vehicle Conductive Charging System, General Requirements," Japan Electric Vehicle Association, Mar. 29, 2001

SUMMARY OF THE INVENTION

Problems to be Solved by the Invention

In the power management system disclosed in above Japanese Patent Laying-Open No. 2001-8380, the charging/discharging control signal is sent from the charging and discharging controller on the house side through the communication antenna to the battery controller on the vehicle side, and switching between the charging control and the discharging control is accomplished in the vehicle, based on the charging/discharging control signal. Separately providing such communication antenna, however, leads to an increase in the system cost and complication of a control device.

Therefore, an object of the present invention is to provide a charging and discharging system that is capable of providing an instruction for switching between the charging control and the discharging control from outside a vehicle, without separately providing a communication antenna.

In addition, another object of the present invention is to provide an electric-powered vehicle that is capable of providing an instruction for switching between the charging control and the discharging control from outside the vehicle, without separately providing a communication antenna.

Means for Solving the Problems

According to the present invention, a charging and discharging system is directed to a charging and discharging system for a vehicle that allows charging of a power storage device mounted on the vehicle from a power supply external to the vehicle and allows power feeding from the power storage device to the power supply external to the vehicle or an electric load external to the vehicle, including: a power converting device; a controller; and a signal generating circuit. The power converting device is configured to be capable of operating in any one of a charging mode in which a voltage of electric power supplied from the power supply external to the vehicle is converted and the power storage device is charged with the electric power, and a power feeding mode in which a voltage of electric power output from the power storage device is converted and the electric power is supplied to the power supply external to the vehicle or the electric load. The controller is mounted on the vehicle, for controlling the power converting device in any one of the charging mode and the power feeding mode, The signal generating circuit is provided outside the vehicle, for generating a control signal (pilot signal) whose pulse width is modulated based on magnitude of a current that can be transmitted and received through a power cable electrically connecting the power supply external to the vehicle or the electric load with the vehicle, and for sending the generated control signal to the controller. The signal generating circuit generates the control signal to allow distinction as to whether the power cable is for charging or for power feeding. The controller controls the power converting device in any one of the charging mode and the power feeding mode, in response to the control signal provided from the signal generating circuit.

Preferably, the power cable includes a plug for connecting the power cable to the power supply external to the vehicle or the electric load. The signal generating circuit generates the control signal (pilot signal) to allow the distinction as to whether the power cable is for charging or for power feeding, based on a shape of the plug.

More preferably, when the plug has a male-type shape, the signal generating circuit generates the control signal indicating that the power cable is for charging.

More preferably, when the plug has a female-type shape, the signal generating circuit generates the control signal indicating that the power cable is for power feeding.

According to the present invention, an electric-powered vehicle is directed to an electric-powered vehicle that allows charging of a power storage device that can supply electric power to a motor for traveling, from a power supply external to the vehicle, and allows power feeding from the power storage device to the power supply external to the vehicle or an electric load external to the vehicle, including: a power converting device; and a controller. The power converting device is configured to be capable of operating in any one of a charging mode in which a voltage of electric power supplied from the power supply external to the vehicle is converted and the power storage device is charged with the electric power, and a power feeding mode in which a voltage of electric power output from the power storage device is converted and the electric power is supplied to the power supply external to the vehicle or the electric load. The controller controls the power converting device in any one of the charging mode and the power feeding mode, in response to a control signal (pilot signal) provided from outside the vehicle. A pulse width of the control signal (pilot signal) is modulated based on magnitude of a current that can be transmitted and received through a power cable electrically connecting the power supply external to the vehicle or the electric load with the electric-powered vehicle, and the control signal is generated to allow distinction as to whether the power cable is for charging or for power feeding.

Preferably, the power cable includes a plug for connecting the power cable to the power supply external to the vehicle or the electric load. The control signal (pilot signal) is generated to allow the distinction as to whether the power cable is for charging or for power feeding, based on a shape of the plug.

More preferably, when the plug has a male-type shape, the control signal indicating that the power cable is for charging is generated.

More preferably, when the plug has a female-type shape, the control signal indicating that the power cable is for power feeding is generated.

Effects of the Invention

In the present invention, the signal generating circuit generates the control signal (pilot signal) whose pulse width is modulated based on the magnitude of the current that can be transmitted and received through the power cable, and sends the generated control signal to the controller. The signal generating circuit generates the above control signal to allow distinction as to whether the power cable is for charging or for power feeding, and the controller controls the power converting device in any one of the charging mode and the power feeding mode in response to the control signal provided from the signal generating circuit. Therefore, switching between the charging mode and the power feeding mode is accomplished in the vehicle by using the control signal (pilot signal) generated by the signal generating circuit.

Hence, according to the present invention, an instruction for switching between the charging control and the discharging control can be provided from outside the vehicle, without separately providing the communication antenna. In addition, according to the present invention, since the vehicle is simultaneously notified of information about the magnitude of the current that can be transmitted and received through the power cable as well as information about the charging/power feeding mode, the charging control or the discharging control can start immediately after connection of the power cable.

BRIEF DESCRIPTION OF THE DRAWINGS

FIG. 4 illustrates a plug of a power cable for charging shown in FIG. 3.

FIG. 5 illustrates a waveform of a pilot signal generated by a control pilot circuit.

FIG. 6 illustrates the relationship between the duty of the pilot signal and a limit of a current that can be passed through the power cable for charging.

FIG. 9 illustrates a plug of a power cable for power feeding shown in FIG. 8.

FIG. 10 illustrates the relationship between the duty of the pilot signal and a limit of a current that can be passed through the power cable for power feeding.

FIG. 11 is a timing chart of the pilot signal and the switches at the time of power feeding.

FIG. 12 is a flowchart for describing the process until the charging control or the power feeding control actually starts.

MODES FOR CARRYING OUT THE INVENTION

Figure 1:
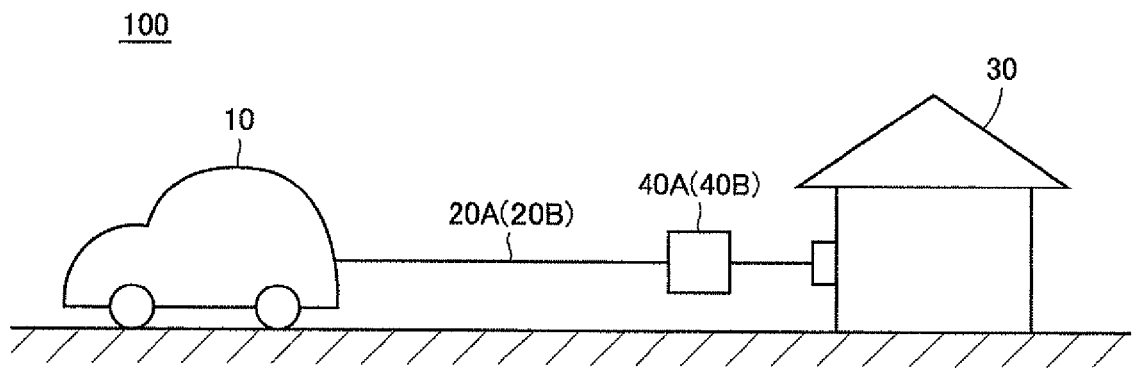
FIG. 1 is an overall view of a charging and discharging system according to an embodiment of the present invention.

Embodiments of the present invention will be hereinafter described in detail with reference to the drawings. The same or corresponding portions are represented by the same reference characters in the drawings, and description thereof will not be repeated.

FIG. 1 is an overall view of a charging and discharging system according to an embodiment of the present invention. Referring to FIG. 1, a charging and discharging system 100 includes an electric-powered vehicle 10, a power cable 20A (or 20B), a house 30, and a CCID (Charging Circuit Interrupt Device) 40A (or 40B). Electric-powered vehicle 10 is an electric-powered vehicle having a power storage device and a motor mounted thereon as a power source for traveling, and includes, for example, an electric vehicle, a hybrid vehicle, a fuel cell vehicle, and the like. Electric-powered vehicle 10 is configured to allow charging of the power storage device from house 30 through power cable 20A when electric-powered vehicle 10 is connected to power cable 20A. In addition, electric-powered vehicle 10 is configured to allow power feeding from the power storage device through power cable 20B to house 30 when electric-powered vehicle 10 is connected to power cable 20B.

Power cable 20A is a cable for charging that is used to charge the power storage device mounted on electric-powered vehicle 10 from house 30. In addition, power cable 20A is also used as a communication medium between electric-powered vehicle 10 and CCID 40A provided at power cable 20A. CCID 40A is provided at power cable 20A. CCID 40A communicates with electric-powered vehicle 10 through power cable 20A, and notifies electric-powered vehicle 10 that power cable 20A is a power cable for charging. In addition, CCID 40A connects/disconnects a conducting path within power cable 20A while checking the state of electric-powered vehicle 10.

Electric-powered vehicle 10 may also be connected to house 30 by power cable 20B. Power cable 20B is a cable for power feeding that is used to feed electric power from the power storage device mounted on electric-powered vehicle 10 to house 30. In addition, power cable 20B is also used as a communication medium between electric-powered vehicle 10 and CCID 40B provided at power cable 20B. CCID 40B is provided at power cable 20B. CCID 40B communicates with electric-powered vehicle 10 through power cable 20B, and notifies electric-powered vehicle 10 that power cable 20B is a cable for power feeding. In addition, CCID 40B connects/disconnects a conducting path within power cable 20B while checking the state of electric-powered vehicle 10.

Figure 2:
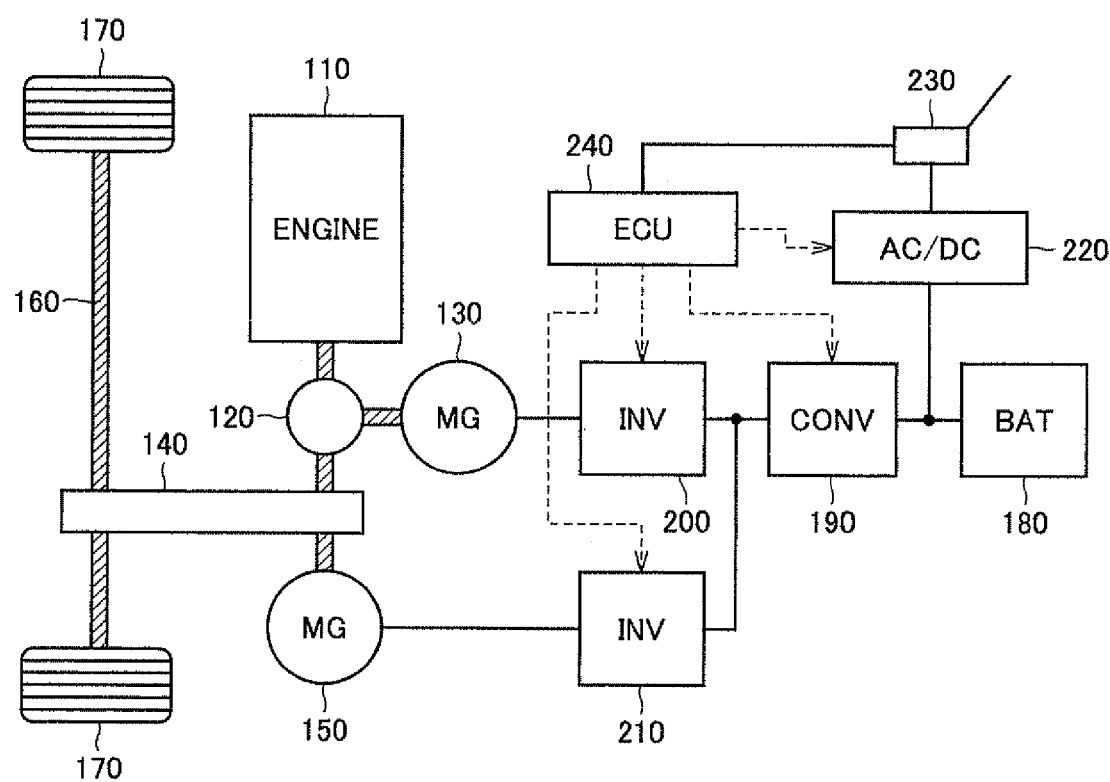
FIG. 2 is a block diagram illustrating a configuration of an electric-powered vehicle shown in FIG. 1.

FIG. 2 is a block diagram illustrating a configuration of electric-powered vehicle 10 shown in FIG. 1. This FIG. 2 illustrates, as an example, the case where electric-powered vehicle 10 is a hybrid vehicle. Referring to FIG. 2, electric-powered vehicle 10 includes an engine 110, a power split device 120, motor generators 130 and 150, a reduction gear 140, a drive shaft 160, and a drive wheel 170. In addition, electric-powered vehicle 10 further includes a power storage device 180, a boost converter 190, inverters 200 and 210, an AC/DC converter 220, an inlet 230, and an ECU (Electronic Control Unit) 240.

Engine 110, and motor generators 130 and 150 are coupled to power split device 120. Electric-powered vehicle 10 travels by using driving force from at least one of engine 110 and motor generator 150. Motive power generated by engine 110 is split by power split device 120 into two paths, that is, one path through which the motive power is transmitted to drive shaft 160 via reduction gear 140, and the other through which the motive power is transmitted to motor generator 130.

Motor generator 130 is an AC rotating electric machine, and is a three-phase AC synchronous motor, for example. Motor generator 130 generates electric power by using the motive power of engine 110 split by power split device 120. For example, when a state of charge (also referred to as "SOC (State of Charge)") of power storage device 180 falls below a predetermined value, engine 110 starts and electric power is generated by motor generator 130. The electric power generated by motor generator 130 is converted from AC to DC by inverter 200, stepped down by boost converter 190, and then is stored in power storage device 180.

Motor generator 150 is an AC rotating electric machine, and is a three-phase AC synchronous motor, for example. Motor generator 150 generates driving force for the vehicle by using at least one of the electric power stored in power storage device 180 and the electric power generated by motor generator 130. The driving force of motor generator 150 is transmitted to drive shaft 160 via reduction gear 140.

It is noted that, at the time of braking and the like of the vehicle, motor generator 150 is driven by using kinetic energy of the vehicle, and motor generator 150 is operated as a generator. As a result, motor generator 150 is operated as a regenerative brake for converting braking energy to electric power. The electric power generated by motor generator 150 is stored in power storage device 180.

Power split device 120 is formed of a planetary gear including a sun gear, a pinion gear, a carrier, and a ring gear. The pinion gear engages the sun gear and the ring gear. The carrier rotatably supports the pinion gear, and in addition, is coupled to a crankshaft of engine 110. The sun gear is coupled to a rotation shaft of motor generator 130. The ring gear is coupled to a rotation shaft of motor generator 150 and reduction gear 140.

Power storage device 180 is a rechargeable DC power supply, and is formed of a secondary battery such as nickel-metal hydride and lithium ion, for example. In addition to the electric power generated by motor generators 130 and 150, electric power supplied from house 30 (FIG. 1) and input from inlet 230 is also stored in power storage device 180. It is noted that a large-capacitance capacitor can also be employed as power storage device 180.

Boost converter 190 adjusts a DC voltage provided to inverters 200 and 210 to be higher than or equal to the voltage of power storage device 180, based on a control signal from ECU 240. Boost converter 190 is configured by a boost chopper circuit, for example.

Inverter 200 converts the electric power generated by motor generator 130 to DC electric power and outputs the DC electric power to boost converter 190, based on the control signal from ECU 240. Inverter 210 converts electric power supplied from boost converter 190 to AC electric power and outputs the AC electric power to motor generator 150, based on the control signal from ECU 240. It is noted that, at startup of engine 110, inverter 200 converts the electric power supplied from boost converter 190 to AC electric power and outputs the AC electric power to motor generator 130. At the time of braking of the vehicle or at the time of reduction in acceleration on a downhill, inverter 210 converts the electric power generated by motor generator 150 to DC electric power and outputs the DC electric power to boost converter 190.

In the charging mode in which power storage device 180 is charged from house 30 (FIG. 1), AC/DC converter 220 converts, to DC, charging power (AC) supplied from house 30 through power cable 20A for charging (FIG. 1) connected to inlet 230, and outputs the DC charging power to power storage device 180. In the power feeding mode in which electric power is fed from power storage device 180 to house 30, AC/DC converter 220 converts the electric power (DC) output from power storage device 180 to AC, and outputs the AC electric power to power cable 20B for power feeding (FIG. 1) connected to inlet 230.

Inlet 230 is an interface for connecting power cable 20A or 20B to electric-powered vehicle 10. When power cable 20A or 20B is connected, inlet 230 notifies ECU 240 that power cable 20A or 20B is connected. In addition, when power cable 20A for charging is connected, inlet 230 provides the charging power supplied from power cable 20A to AC/DC converter 220. When power cable 20B for power feeding is connected, inlet 230 outputs the electric power received from AC/DC converter 220 to power cable 20B. Furthermore, inlet 230 transmits a signal between power cable 20A (or 20B) and ECU 240.

ECU 240 generates the control signals for driving boost converter 190 and inverters 200 and 210, and outputs the generated control signals to boost converter 190 and inverters 200 and 210. In addition, in the charging mode, ECU 240 generates a control signal for driving AC/DC converter 220 to receive the charging power from inlet 230 and charge power storage device 180, and outputs the generated control signal to AC/DC converter 220. Furthermore, in the power feeding mode, ECU 240 generates a control signal for driving AC/DC converter 220 to convert the electric power output from power storage device 180 to AC and output the AC electric power to inlet 230, and outputs the generated control signal to AC/DC converter 220.

Figure 3:
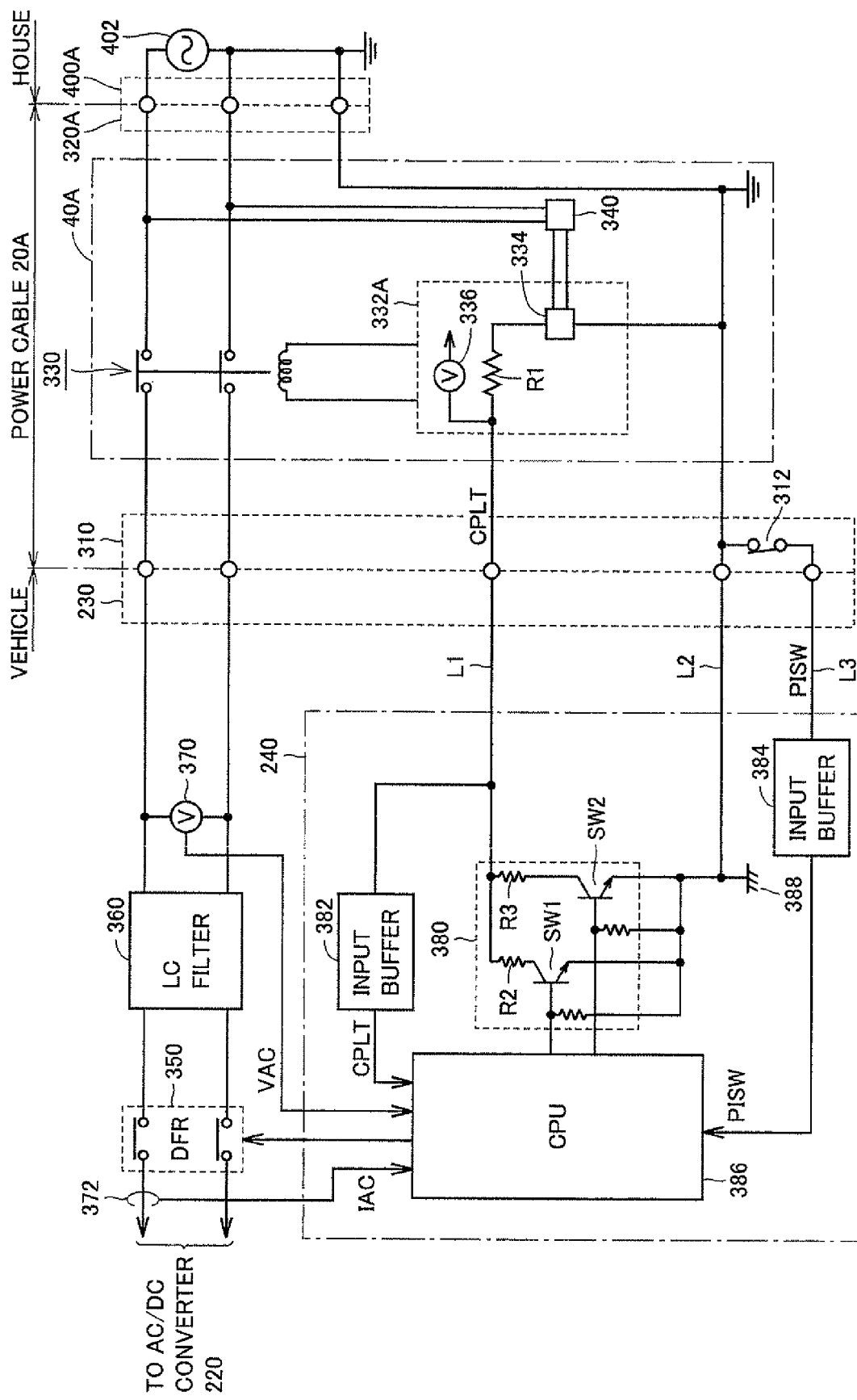
FIG. 3 is a diagram for describing a charging mechanism in the charging and discharging system in more detail.

FIG. 3 is a diagram for describing a charging mechanism in this charging and discharging system 100 in more detail.

Referring to FIG. 3, at the time of charging of electric-powered vehicle 10 from house 30, electric-powered vehicle 10 and house 30 are connected by power cable 20A for charging. Power cable 20A includes a connector 310, a plug 320A and a CCID 40A. Plug 320A on the house side is connected to an outlet 400A provided at house 30. Outlet 400A is supplied with AC electric power from a power supply 402 (for example, system power supply).

Connector 310 on the vehicle side is connected to inlet 230 of electric-powered vehicle 10. Connector 310 is provided with a limit switch 312, and when connector 310 is connected to inlet 230, limit switch 312 is activated. Then, a cable connection signal PISW whose signal level changes with the activation of limit switch 312 is input to ECU 240 of electric-powered vehicle 10.

CCID 40A includes a CCID relay 330, a control pilot circuit 332A and a power supply circuit 340. CCID relay 330 is provided at a pair of power lines within power cable 20A, and is turned on/off by control pilot circuit 332A. Power supply circuit 340 is connected to the pair of power lines between CCID relay 330 and plug 320A. Power supply circuit 340 converts the electric power supplied from power supply 402 when plug 320A is connected to outlet 400A, to electric power for operating control pilot circuit 332A, and outputs the converted electric power to control pilot circuit 332A.

Control pilot circuit 332A outputs a pilot signal CPLT to ECU 240 of the vehicle through connector 310 and inlet 230. This pilot signal CPLT is a signal for providing notification of a limit of a current that can be passed through power cable 20A to ECU 240 of the vehicle, and in addition, remotely controlling CCID relay 330 by ECU 240 based on the potential of pilot signal CPLT manipulated by ECU 240. Control pilot circuit 332A controls CCID relay 330 based on a change in the potential of pilot signal CPLT. Control pilot circuit 332A includes an oscillator 334, a resistance element R1 and a voltage sensor 336. Oscillator 334 operates by receiving electric power from power supply circuit 340. Oscillator 334 outputs a non-oscillating signal when the potential of pilot signal CPLT detected by voltage sensor 336 is around a prescribed potential V1 (for example, 12V), and outputs a signal that oscillates at a prescribed frequency (for example, 1 kHz) and duty cycle, when the potential of pilot signal CPLT is lowered from V1. It is noted that the potential of pilot signal CPLT is manipulated by switching a resistance value of a resistance circuit 380 of ECU 240 as will be described hereinafter. In addition, the duty cycle is set based on the limit of the current that can be passed through power cable 20A. When the potential of pilot signal CPLT is lowered to around a prescribed potential V3 (for example, 6V), control pilot circuit 332A turns on CCID relay 330.

On the other hand, on the vehicle side, a DFR (Dead Front Relay) 350 and an LC filter 360 are provided at a power line between inlet 230 and AC/DC converter 220 (FIG. 2). DFR 350 is a relay for electrically connecting/separating inlet 230 and AC/DC converter 220, and is turned on/off in response to the control signal from ECU 240. In other words, in the charging mode in which power storage device 180 is charged from house 30, DFR 350 is turned on and inlet 230 is electrically connected to AC/DC converter 220. LC filter 360 is provided between DFR 350 and inlet 230, and prevents the high-frequency noise generated in accordance with the switching operation of AC/DC converter 220 from being output to power cable 20A.

A voltage sensor 370 detects a voltage VAC of power supply 402 and outputs the detected value to ECU 240 in the charging mode. A current sensor 372 detects a current IAC supplied from power supply 402 and outputs the detected value to ECU 240 in the charging mode.

ECU 240 includes a resistance circuit 380, input buffers 382 and 384, and a CPU (Control Processing Unit) 386. Resistance circuit 380 includes pull-down resistances R2, R3 and switches SW1, SW2. Pull-down resistance R2 and switch SW1 are serially connected between a vehicle earth 388 and a control pilot line L1 through which pilot signal CPLT is communicated. Pull-down resistance R3 and switch SW2 are also serially connected between vehicle earth 388 and control pilot line L1. Switches SW1 and SW2 are turned on/off in response to a control signal from CPU 386.

This resistance circuit 380 manipulates the potential of pilot signal CPLT. Specifically, when connector 310 is connected to inlet 230, CPU 386 turns on switch SW1, and resistance circuit 380 lowers the potential of pilot signal CPLT to prescribed potential V2 (for example, 9V) by using pull-down resistance R2. When preparation for charging is completed in the vehicle, CPU 386 turns on switch SW2, and resistance circuit 380 lowers the potential of pilot signal CPLT to prescribed potential V3 by using pull-down resistances R2 and R3. As described above, the potential of pilot signal CPLT is manipulated by using resistance circuit 380, and thereby, CCID relay 330 of CCID 40A can be remotely controlled by ECU 240.

Input buffer 382 receives pilot signal CPLT of control pilot line L1, and outputs received pilot signal CPLT to CPU 386. Input buffer 384 receives cable connection signal PISW from a signal line L3 connected to limit switch 312 of connector 310, and outputs received cable connection signal PISW to CPU 386.

It is noted that a voltage is applied to signal line L3 from ECU 240, and when connector 310 is connected to inlet 230, limit switch 312 is turned on and the potential of signal line L3 is set to the ground level. In other words, cable connection signal PISW is set to the L (logical low) level when connector 310 is connected to inlet 230, and is set to the H (logical high) level when connector 310 is not connected to inlet 230.

CPU 386 determines whether or not power supply 402 and the vehicle are connected, based on cable connection signal PISW and pilot signal CPLT. Specifically, CPU 386 detects that inlet 230 and connector 310 are connected, based on cable connection signal PISW received from input buffer 384, and detects that plug 320A and outlet 400A are connected, based on the presence or absence of input of pilot signal CPLT received from input buffer 382.

When it is detected based on cable connection signal PISW that inlet 230 and connector 310 are connected, CPU 386 turns on switch SW1. As a result, the potential of pilot signal CPLT is lowered from V1 and pilot signal CPLT oscillates. CPU 386 senses the limit of the current that can be received from power cable 20A, based on the duty cycle of pilot signal CPLT.

When the limit of the current that can be received from power cable 20A is sensed and the preparation for charging of power storage device 180 is completed, CPU 386 turns on switch SW2. As a result, the potential of pilot signal CPLT is lowered to V3, and CCID relay 330 is turned on in CCID 40A. Thereafter, CPU 386 turns on DFR 350. As a result, the electric power from power supply 402 is provided to AC/DC converter 220 (FIG. 2), and CPU 386 performs charging control of power storage device 180 based on voltage VAC detected by voltage sensor 370 and current IAC detected by current sensor 372.

FIG. 4 illustrates plug 320A of power cable 20A for charging shown in FIG. 3. Referring to FIG. 4, plug 320A provided for this power cable 20A for charging is formed of a male-type plug. In other words, power cable 20A is connected to house 30 by inserting plug 320A into outlet 400A (FIG. 3) at house 30.

FIG. 5 illustrates a waveform of pilot signal CPLT generated by control pilot circuit 332A. Referring to FIG. 5, pilot signal CPLT oscillates in a prescribed cycle T. Here, a pulse width Ton of pilot signal CPLT is set based on the current (current limit) that can be supplied from house 30 to the vehicle through power cable 20A. Notification of the current limit of power cable 20A is provided from control pilot circuit 332A to ECU 240 of the vehicle, in accordance with the duty indicated by a ratio of pulse width Ton to cycle T.

It is noted that the current limit is defined for each power cable. Depending on the type of the power cable, the current limit varies, and therefore, the duty of pilot signal CPLT also varies. ECU 240 of the vehicle receives, through the control pilot line, pilot signal CPLT sent from control pilot circuit 332A provided in power cable 20A, and senses the duty of received pilot signal CPLT, so that ECU 240 of the vehicle can sense the limit of the current that can be received from power cable 20A.

FIG. 6 illustrates the relationship between the duty of pilot signal CPLT and the limit of the current that can be passed through power cable 20A for charging. Referring to FIG. 6, the duty of pilot signal CPLT varies depending on the current limit of power cable 20A. The current limit of power cable 20A can be sensed in electric-powered vehicle 10 by sensing the duty of pilot signal CPLT sent from CCID 40A in CPU 386 of electric-powered vehicle 10.

Figure 7:
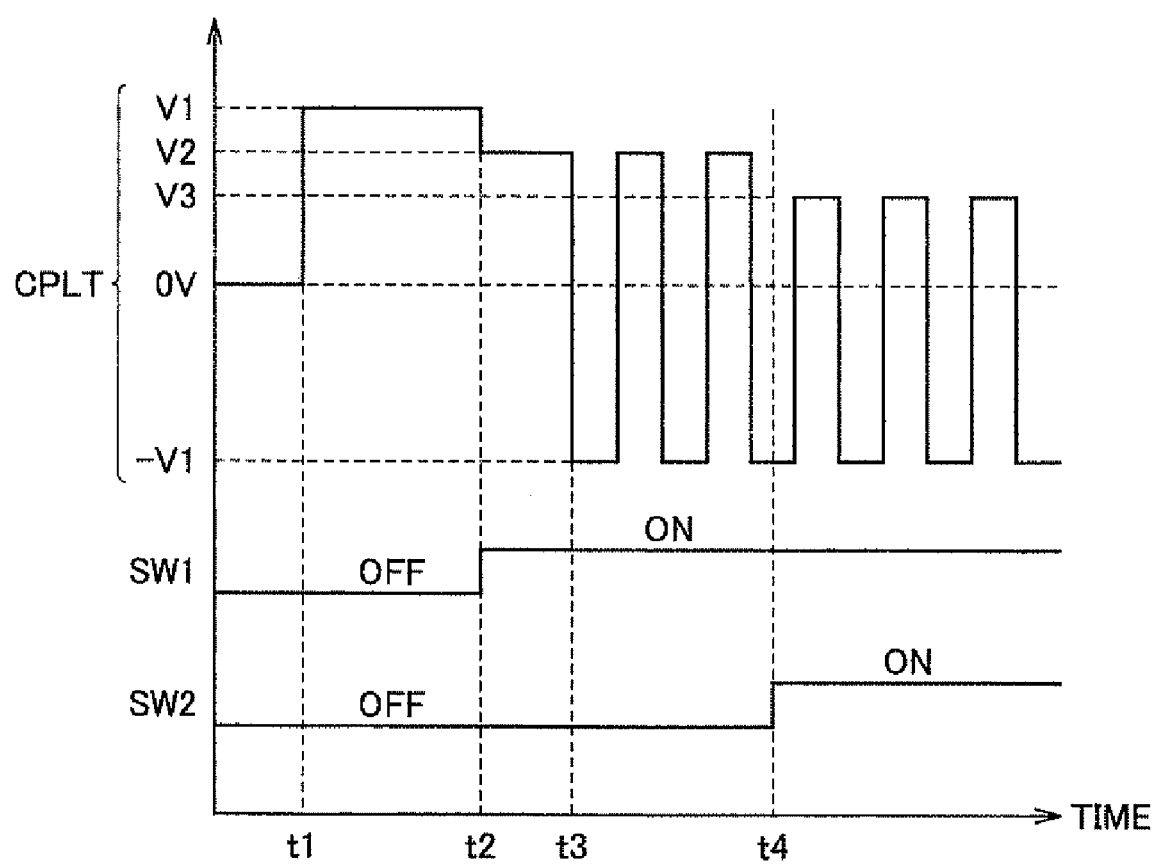
FIG. 7 is a timing chart of the pilot signal and switches at the time of charging.

FIG. 7 is a timing chart of pilot signal CPLT and switches SW1 and SW2 at the time of charging. Referring to FIG. 7, at time t1, when plug 320A of power cable 20A is connected to outlet 400A on the house 30 side, control pilot circuit 332A receives the electric power from power supply 402 and generates pilot signal CPLT.

It is noted that, at this point, connector 310 of power cable 20A is not connected to inlet 230 on the vehicle side, and the potential of pilot signal CPLT is at V1 (for example, 12V) and pilot signal CPLT is in the non-oscillating state.

At time t2, when connector 310 is connected to inlet 230, the potential of pilot signal CPLT is lowered to V2 (for example, 9V) by pull-down resistance R2 of resistance circuit 380. Then, at time t3, control pilot circuit 332A causes pilot signal CPLT to oscillate. The current limit of power cable 20A is sensed in CPU 386 of the vehicle based on the duty of pilot signal CPLT, and when the preparation for charging control is completed, switch SW2 is turned on by CPU 386 at time t4. Then, the potential of pilot signal CPLT is further lowered to V3 (for example, 6V) by pull-down resistance R3 of resistance circuit 380.

When the potential of pilot signal CPLT is lowered to V3, CCID relay 330 of CCID 40A is turned on by control pilot circuit 332A. Thereafter, DFR 350 is turned on in the vehicle and power storage device 180 is charged from power supply 402.

Figure 8:
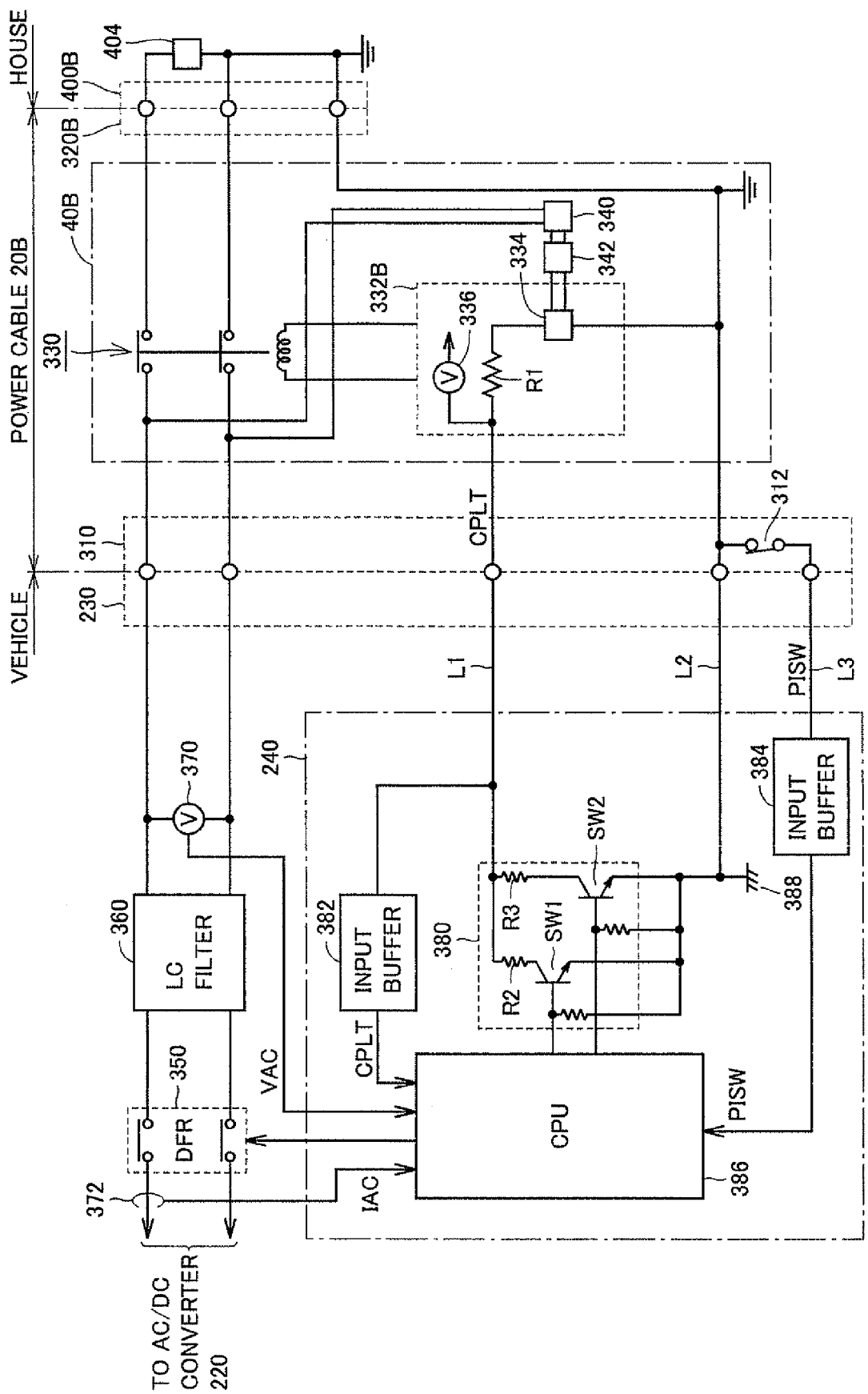
FIG. 8 is a diagram for describing a discharging mechanism in the charging and discharging system in more detail.

FIG. 8 is a diagram for describing a discharging mechanism in this charging and discharging system 100 in more detail. Referring to FIG. 8, at the time of power feeding from electric-powered vehicle 10 to house 30, electric-powered vehicle 10 and house 30 are connected by power cable 20B for power feeding. Power cable 20B includes connector 310, a plug 320B and a CCID 40B. Connector 310 on the vehicle side is common to that of power cable 20A for charging. Plug 320B on the house side is different from power cable 20A for charging in terms of shape. Plug 320B is connected to outlet 400B provided at house 30. An electric load 404 within house 30 is connected to outlet 400B.

CCID 40B further includes a power storage unit 342 as compared with a configuration of CCID 40A in power cable 20A for charging shown in FIG. 3, and includes a control pilot circuit 332B instead of control pilot circuit 332A. Power supply circuit 340 is connected to a pair of power lines between connector 310 and CCID relay 330. Power supply circuit 340 converts the electric power supplied from electric-powered vehicle 10 when connector 310 is connected to inlet 230 of electric-powered vehicle 10, to electric power for operating control pilot circuit 332B, and outputs the converted electric power to power storage unit 342.

When connector 310 is connected to inlet 230, power storage unit 342 is charged with the electric power supplied from electric-powered vehicle 10. In other words, during power feeding from electric-powered vehicle 10 to electric load 404 in house 30, the electric power for operating control pilot circuit 332B cannot be obtained from the house 30 side. Thus, power storage unit 342 is charged with the electric power that was fed from electric-powered vehicle 10 when power cable 20B was used in the previous time, and the electric power for operating control pilot circuit 332B until electric-powered vehicle 10 starts power feeding can be obtained.

Although a configuration of control pilot circuit 332B is similar to that of control pilot circuit 332A in CCID 40A, control pilot circuit 332B generates pilot signal CPLT such that it can be distinguished from pilot signal CPLT generated by control pilot circuit 332A. For example, control pilot circuit 332B generates pilot signal CPLT having a potential different from that of pilot signal CPLT generated by control pilot circuit 332A. Specifically, control pilot circuit 332B generates pilot signal CPLT having potentials V4 to V6 corresponding to potentials V1 to V3 that pilot signal CPLT generated by control pilot circuit 332A can have, respectively (V4≠V1, V5≠V2, and V6≠V3).

It is noted that, in order to make a difference in potential between pilot signal CPLT generated by control pilot circuit 332A and pilot signal CPLT generated by control pilot circuit 332B, the output potential of oscillator 334 may be varied or a difference in a resistance value of resistance element R1 may be made between control pilot circuit 332A and control pilot circuit 332B.

On the other hand, on the vehicle side, when connector 310 is connected to inlet 230, switch SW1 is turned on by CPU 386, and resistance circuit 380 lowers the potential of pilot signal CPLT from V4 to V5 by using pull-down resistance R2. When preparation for power feeding is completed in the vehicle, switch SW2 is turned on by CPU 386, and resistance circuit 380 lowers the potential of pilot signal CPLT to a prescribed potential V6 by using pull-down resistances R2 and R3. As described above, at the time of power feeding from electric-powered vehicle 10 to electric load 404 in house 30 as well, the potential of pilot signal CPLT is manipulated by using resistance circuit 380, and CCID relay 330 of CCID 40B is remotely controlled by ECU 240.

CPU 386 performs the power feeding control from power storage device 180 to electric load 404 in house 30, based on voltage VAC detected by voltage sensor 370 and current IAC detected by current sensor 372.

FIG. 9 illustrates plug 320B of power cable 20B for power feeding shown in FIG. 8. Referring to FIG. 9, plug 320B provided for this power cable 20B for power feeding is formed of a female-type plug. The reason why plug 320B is the female-type plug unlike plug 320A of power cable 20A for charging is that plug 320B serves as an output terminal for the electric power.

FIG. 10 illustrates the relationship between the duty of pilot signal CPLT and a limit of a current that can be passed through power cable 20B for power feeding. Referring to FIG. 10, the duty of pilot signal CPLT is allocated to regions (d7 to d9) different from regions (d1 to d7) used in power cable 20A for charging. Similarly to power cable 20A for charging, the duty of pilot signal CPLT varies depending on the current limit of power cable 20B. The current limit of power cable 20B can be sensed in electric-powered vehicle 10 by sensing the duty of pilot signal CPLT sent from CCID 40B in CPU 386 of electric-powered vehicle 10.

FIG. 11 is a timing chart of pilot signal CPLT and switches SW1 and SW2 at the time of power feeding. Referring to FIG. 11, at time t1, when connector 310 is connected to inlet 230, the potential of pilot signal CPLT is lowered from V4 to V5 by pull-down resistance R2 of resistance circuit 380. Then, at time t2, control pilot circuit 332B of CCID 40B causes pilot signal CPLT to oscillate. When the current limit of power cable 20B is sensed in CPU 386 of the vehicle based on the duty of pilot signal CPLT and the preparation for power feeding control is completed, switch SW2 is turned on by CPU 386 at time t3. Then, the potential of pilot signal CPLT is further lowered to V6 by pull-down resistance R3 of resistance circuit 380.

When the potential of pilot signal CPLT is lowered to V6, CCID relay 330 of CCID 40B is turned on by control pilot circuit 332B. Thereafter, DFR 350 is turned on in the vehicle and the electric power is fed from power storage device 180 to electric load 404 in house 30.

FIG. 12 is a flowchart for describing the process until the charging control or the power feeding control actually starts. Referring to FIG. 12, when the user connects power cable 20A to outlet 400A at house 30 or when the user connects power cable 20B to outlet 400B at house 30 (step S10), welding check of CCID relay 330 is carried out on the power cable side (step S20). It is noted that, in power cable 20A for charging, plug 320A is connected to outlet 400A and the electric power supplied from power supply 402 is used, and in power cable 20B for power feeding, the electric power stored in power storage unit 342 of CCID 40B is used. It is noted that, at this point, only the welding check of CCID relay 330 is carried out and CCID relay 330 is not driven (OFF state).

Next, when the user connects connector 310 of power cable 20A or 20B to inlet 230 of electric-powered vehicle 10 (step S30), ECU 240 of electric-powered vehicle 10 senses the connection of the power cable based on cable connection signal PISW (YES in step S40). When the connection of the power cable is sensed, ECU 240 fixes the control mode of the vehicle based on the potential of pilot signal CPLT (step S50). Specifically, ECU 240 sets the control mode to the charging mode when the voltage of pilot signal CPLT is at V1, and sets the control mode to the power feeding mode when the voltage of pilot signal CPLT is at V4.

Next, ECU 240 carries out the welding check of CCID relay 330 (step S60). It is noted that, although not specifically shown, ECU 240 outputs an alarm and ends the process when it is determined that CCID relay 330 is welded. Next, ECU 240 performs the process of the welding check of DFR 350 (step S70). It is noted that, although not specifically shown, ECU 240 also outputs the alarm and ends the process when it is determined that DFR 350 is welded.

When the welding check of the DFR ends, ECU 240 turns on DFR 350 (step S80). When DFR 350 is turned on, ECU 240 uses pilot signal CPLT to provide notification of a command for turning on CCID relay 330 to control pilot circuit 332A (or 332B) of the power cable, and CCID relay 330 of the power cable is turned on by control pilot circuit 332A (or 332B) (step S90).

Thereafter, power storage device 180 is actually charged from power supply 402 or the electric power is actually fed from power storage device 180 to electric load 404 in house 30, in accordance with the control mode, based on each detected value of voltage VAC from voltage sensor 370 and current IAC from current sensor 372 (step S100).

As in the foregoing, in the present embodiment, control pilot circuits 332A and 332B generate pilot signal CPLT, and send generated pilot signal CPLT to ECU 240 of electric-powered vehicle 10. Here, control pilot circuits 332A and 332B generate pilot signal CPLT to allow distinction as to whether the power cable is for charging or for power feeding. More specifically, control pilot circuit 332A of power cable 20A having male-type plug 320A generates pilot signal CPLT such that power cable 20A can be identified as the power cable for charging on the vehicle side, and control pilot circuit 332B of power cable 20B having female-type plug 320B generates pilot signal CPLT such that power cable 20B can be identified as the power cable for power feeding on the vehicle side. ECU 240 of electric-powered vehicle 10 controls AC/DC converter 220 in any one of the charging mode and the power feeding mode in response to pilot signal CPLT provided from control pilot circuit 332A or 332B. Therefore, switching between the charging mode and the power feeding mode is accomplished in the vehicle by using pilot signal CPLT.

Hence, according to the present embodiment, an instruction for switching between the charging control and the power feeding control can be provided from outside the vehicle, without separately providing the communication antenna. In addition, according to the present embodiment, since the vehicle is notified of information about the charging/power feeding mode by using pilot signal CPLT, the charging control or the power feeding control can start immediately after connection of power cable 20A or 20B.

Although pilot signal CPLT generated by control pilot circuit 332A is distinguishable from pilot signal CPLT generated by control pilot circuit 332B by varying the potential of pilot signal CPLT in the above embodiment, pilot signal CPLT generated by control pilot circuit 332A may be distinguishable from pilot signal CPLT generated by control pilot circuit 332B by varying the duty of the signal.

In addition, although power cable 20A for charging and power cable 20B for power feeding are separately configured in the above, a switch for switching between charging and power feeding, for example, may be provided in the CCID and the like to be capable of switching the intended uses, without separately providing the power cable for charging and the power cable for power feeding. At this time, pilot signal CPLT may be generated such that a distinction can be made between charging and power feeding, by switching the potential and the duty of pilot signal CPLT in accordance with the switch.

In addition, although the electric power can be transmitted and received between power storage device 180 and house 30 by using AC/DC converter 220 in electric-powered vehicle 10 in the above, the electric power can also be transmitted and received between electric-powered vehicle 10 and house 30 by connecting the pair of power lines from inlet 230 to neutral points of motor generators 130 and 150, respectively, and adjusting the voltage between the neutral points by means of inverters 200 and 210, without providing a dedicated converter.

In addition, although electric-powered vehicle 10 is a hybrid vehicle having the engine and the motor generators mounted thereon as a power source for traveling in the above, the range of application of the present invention is not limited to the hybrid vehicle, but includes an electric vehicle that does not have an engine mounted thereon, a fuel cell vehicle having a fuel cell mounted thereon as a DC power supply, and the like.

It is noted that, in the above, AC/DC converter 220 corresponds to "power converting device" in the present invention, and ECU 240 corresponds to "controller" in the present invention. In addition, control pilot circuits 332A and 332B correspond to "signal generating circuit" in the present invention.

It should be understood that the embodiments disclosed herein are illustrative and not limitative in any respect. The scope of the present invention is defined by the terms of the claims, rather than the above description of the embodiments, and is intended to include any modifications within the scope and meaning equivalent to the terms of the claims.

DESCRIPTION OF THE REFERENCE SIGNS 10 electric-powered vehicle; 20A, 20B power cable; 30 house; 40A, 40B CCID; 110 engine; 120 power split device; 130, 150 motor generator; 140 reduction gear; 160 drive shaft; 170 drive wheel; 180 power storage device; 190 boost converter; 200, 210 inverter; 220 AC/DC converter; 230 inlet; 240 ECU; 310 connector; 312 limit switch; 320A, 320B plug; 330 CCID relay; 332A, 332B control pilot circuit; 334 oscillator; 336, 370 voltage sensor; 340 power supply circuit; 342 power storage unit; 350 DFR; 360 LC filter; 372 current sensor; 380 resistance circuit; 382, 384 input buffer; 386 CPU; 388 vehicle earth; 400A, 400B outlet; 402 power supply; 404 electric load; R1 resistance element; R2, R3 pull-down resistance; SW1, SW2 switch; L1 control pilot line; L3 signal line

The invention claimed is:

1. A charging and discharging system for a vehicle that allows charging of a power storage device mounted on the vehicle from a power supply external to the vehicle and allows power feeding from said power storage device to said power supply or an electric load external to the vehicle, comprising:
a power converting device configured to be capable of operating in any one of a charging mode in which a voltage of electric power supplied from said power supply is converted and said power storage device is charged with the electric power, and a power feeding mode in which a voltage of electric power output from said power storage device is converted and the electric power is supplied to said power supply or said electric load;
a controller mounted on said vehicle, for controlling said power converting device in any one of said charging mode and said power feeding mode; and
a signal generating circuit provided outside said vehicle, for generating a control signal whose pulse width is modulated based on magnitude of a current that can be transmitted and received through a power cable electrically connecting said power supply or said electric load with said vehicle, and for sending the generated control signal to said controller,
said signal generating circuit generating said control signal to allow distinction as to whether said power cable is for charging or for power feeding, and
said controller controlling said power converting device in any one of said charging mode and said power feeding mode, in response to said control signal provided from said signal generating circuit.

2. The charging and discharging system according to claim 1, wherein
said power cable includes a plug for connecting the power cable to said power supply or said electric load, and
said signal generating circuit generates said control signal to allow the distinction as to whether said power cable is for charging or for power feeding, based on a shape of said plug.

3. The charging and discharging system according to claim 2, wherein
when said plug has a male-type shape, said signal generating circuit generates said control signal indicating that said power cable is for charging.

4. The charging and discharging system according to claim 2, wherein
when said plug has a female-type shape, said signal generating circuit generates said control signal indicating that said power cable is for power feeding.

5. An electric-powered vehicle that allows charging of a power storage device that can supply electric power to a motor for traveling, from a power supply external to the vehicle, and allows power feeding from said power storage device to said power supply or an electric load external to the vehicle, comprising:
a power converting device configured to be capable of operating in any one of a charging mode in which a voltage of electric power supplied from said power supply is converted and said power storage device is charged with the electric power, and a power feeding mode in which a voltage of electric power output from said power storage device is converted and the electric power is supplied to said power supply or said electric load; and
a controller for controlling said power converting device in any one of said charging mode and said power feeding mode, in response to a control signal provided from outside the vehicle; and
a pulse width of said control signal being modulated based on magnitude of a current that can be transmitted and received through a power cable electrically connecting said power supply or said electric load with the electric-powered vehicle, and said control signal being generated to allow distinction as to whether said power cable is for charging or for power feeding.

6. The electric-powered vehicle according to claim 5, wherein
said power cable includes a plug for connecting the power cable to said power supply or said electric load, and
said control signal is generated to allow the distinction as to whether said power cable is for charging or for power feeding, based on a shape of said plug.

7. The electric-powered vehicle according to claim 6, wherein
when said plug has a male-type shape, said control signal indicating that said power cable is for charging is generated.

8. The electric-powered vehicle according to claim 6, wherein
when said plug has a female-type shape, said control signal indicating that said power cable is for power feeding is generated.

* * * * *